United States Patent
Kim et al.

(10) Patent No.: US 7,203,148 B2
(45) Date of Patent: Apr. 10, 2007

(54) METHOD AND APPARATUS FOR IDENTIFYING THE TYPE OF OPTICAL RECORDING MEDIUM

(75) Inventors: Jong-ryull Kim, Gyeonggi-do (KR); Pyong-yong Seong, Seoul (KR); No-jun Kwak, Gyeonggi-do (KR); Chul-ho Jeon, Gyeonggi-do (KR); Ki-bong Yun, Gyeonggi-do (KR); Bong-hwoan Choi, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 737 days.

(21) Appl. No.: 10/419,786

(22) Filed: Apr. 22, 2003

(65) Prior Publication Data

US 2003/0202444 A1  Oct. 30, 2003

(30) Foreign Application Priority Data

Apr. 30, 2002 (KR) .............................. 2002-23830

(51) Int. Cl.
*G11B 7/00* (2006.01)

(52) U.S. Cl. .............................. 369/53.22; 369/44.27; 369/53.23

(58) Field of Classification Search ............. 369/44.26, 369/44.29, 44.27, 53.2, 53.22, 53.23, 112.24, 369/44.32

See application file for complete search history.

(56) References Cited

U.S. PATENT DOCUMENTS 6,111,832 A * 8/2000 Tsuchiya et al. ......... 369/53.23
6,147,941 A * 11/2000 Kumagai ................. 369/44.26
6,466,531 B1 * 10/2002 Lee ........................... 369/53.2
6,816,443 B1 * 11/2004 Hwang .................... 369/44.32

FOREIGN PATENT DOCUMENTS

| | | |
|---|---|---|
| JP | 10-49975 | 2/1998 |
| JP | 11-149640 | 6/1999 |
| JP | 2000-215454 | 8/2000 |
| JP | 2000-260109 | 9/2000 |
| JP | 2003-233912 | 8/2003 |
| KR | 2000-0052232 | 8/2000 |

OTHER PUBLICATIONS

Chinese Patent Office Action issued Mar. 11, 2005 in the corresponding Chinese application.

* cited by examiner

*Primary Examiner*—Andrea Wellington
*Assistant Examiner*—Kim-Kwok Chu
(74) *Attorney, Agent, or Firm*—Staas & Halsey LLP

(57) ABSTRACT

A method and an apparatus for identifying the type of an optical recording medium are provided. The method includes detecting a surface reflected signal $S_S$ and a writable-surface reflected signal $S_R$ of an optical recording medium while performing a focus search using a first optical system, counting a time difference $DT_S$ between a high peak and a low peak of the surface reflected signal $S_S$, counting a time difference $DT_R$ between the high peak of the surface reflected signal and a high peak of the writable-surface reflected signal $S_R$, obtaining DT by substituting $DT_R$ and $DT_S$ into the following equation:

$$DT = \frac{(DT_R)^a}{(DT_S)^b} \left(a - b \geq \frac{1}{2}\right)$$

and comparing DT with a reference time T, and driving the first optical system if DT is greater than T and driving a second optical system if DT is not greater than T.

23 Claims, 7 Drawing Sheets

METHOD AND APPARATUS FOR IDENTIFYING THE TYPE OF OPTICAL RECORDING MEDIUM

CROSS-REFERENCE TO RELATED APPLICATIONS

This application claims the priority of Korean Patent Application No. 2002-23830, filed on Apr. 30, 2002, in the Korean Intellectual Property Office, the disclosure of which is incorporated herein in its entirety by reference.

BACKGROUND OF THE INVENTION

1. Field of the Invention

The present invention relates to a method and an apparatus for identifying the type of an optical recording medium, and more particularly, to a method and an apparatus for identifying the type of an optical recording medium using a predetermined optical system.

2. Description of the Related Art

In general, optical recording media, i.e., optical disks, are divided into a ROM-type (read only) optical disk, a write once optical disk, and a re-writable optical disk, depending on whether and how many times they can be recorded.

Such optical disks are generally divided into a compact disk (CD), a digital versatile disk (DVD), and a next-generation DVD depending on their storage capacities. A CD has a storage capacity of 650 MB, a DVD has a storage capacity of 4.7 GB, and a next-generation DVD has a larger storage capacity compared with that of a DVD.

Optical disks have different sizes depending on their storage capacities. A CD and a DVD have the same diameter, which is 120 mm, but have different thicknesses. A CD has a thickness of 1.2 mm, and a DVD has a thickness of 0.6 mm. A next-generation DVD is known to have a thickness of about 0.1 mm. A laser beam of 0.4 numerical aperture (NA) and a wavelength of 780 nm is generally used for CDs, and a light beam of 0.6 NA and a wavelength of 650 nm is used for DVDs. A laser beam of 0.85 NA, which belongs to a blue wavelength band, is known to be used for next-generation DVDs.

FIG. 1 is a diagram illustrating the thickness of a CD compared with that of a DVD. Referring to FIG. 1, as described above, while a CD has a thickness $D_C$ of about 1.2 mm, a DVD has a thickness $D_D$ of about 0.6 mm. In other words, a distance between a top surface 31 and a writable surface 35 of the CD is about two times as large as a distance between the top surface 31 and a writable surface 33 of the DVD. Accordingly, as shown in FIG. 2, there exists a difference between a time period $DT_D$ between a surface reflected signal $S_S$ and a writable-surface reflected signal $S^1_R$ and a time period $DT_C$ between a surface reflected signal $S_S$ and a writable-surface reflected signal $S^2_R$.

FIG. 2 is a graph illustrating a conventional method for identifying the type of an optical recording medium. Referring to FIG. 2, the time period $DT_C$ of a CD between the surface reflected signal $S_S$ and the writable-surface reflected signal $S^2_R$ is longer than the time period $DT_D$ of a DVD between the surface reflected signal $S_S$ and the writable-surface reflected signal $S^1_R$. Accordingly, in the related art, a certain reference time difference $T_0$ is set in advance to have a median value between $DT_D$ and $DT_C$, and then a time period $DT_p$ in a predetermined optical recording medium is compared with $T_0$. Here, $DT_p$ is defined as a time difference between the time when a signal reflected from a writable surface of an optical disk is detected and the time when a signal reflected from the surface of the optical disk is detected. If $DT_p$ is greater than $T_0$, the predetermined optical disk is identified as a CD. On the other hand, if $DT_p$ is smaller than $T_0$, the predetermined optical disk is identified as a DVD.

FIG. 3 is a graph showing the variation of a $DT_p$ value with respect to a number of times an experiment for obtaining such $DT_p$ value has been performed in the case of using the conventional method for identifying the type of an optical recording medium. Referring to FIG. 3, a DT value obtained for a CD or a DVD varies considerably with the number of experiments. In particular, in the case of a CD, a DT value in a fourth experiment is 80s, and a DT value in a fifth experiment is 130s. Thus, there exists a difference of a maximum of 50s between DT values. In addition, in a twelfth experiment, a DT value for a CD and a DT value for a DVD are 80s and 95s, respectively, which are very close to each other, and thus it is not easy to figure out the type of an optical recording medium based on its DT value.

However, it may be difficult to determine the optical disk-type using the conventional method where there is a nonlinear driving region in the optical disk where linearity of an actuator is difficult to maintain. In such a nonlinear driving region, an error is more likely to occur during the calculation of both $DT_D$ and $DT_C$, and if that happens, $DT_D$ and $DT_C$ may approximate to $T_0$. Especially, in the case of identifying the type of a special optical disk, such as a deflected disk, such an error may become even greater, depending on the position and tilting direction of an optical disk.

SUMMARY OF THE INVENTION

The present invention provides a method and an apparatus for identifying the type of an optical recording medium by compensating for nonlinearity of an optical pickup actuator.

According to an aspect of the present invention, there is provided a method for identifying the type of an optical recording medium. The method includes detecting a surface reflected signal $S_S$ and a writable-surface reflected signal $S_R$ of an optical recording medium while performing a focus search using a first optical system, counting a time difference $DT_S$ between a high peak and a low peak of the surface reflected signal $S_S$, counting a time difference $DT_R$ between the high peak of the surface reflected signal and a high peak of the writable-surface reflected signal $S_R$, obtaining DT by substituting $DT_R$ and $DT_S$ into the following equation:

$$DT = \frac{(DT_R)^a}{(DT_S)^b}\left(a - b \geq \frac{1}{2}\right)$$

and comparing DT with a reference time T, and driving the first optical system if DT is greater than T and driving a second optical system if DT is not greater than T.

In one embodiment, $DT_R$ of the first optical system is greater than $DT_R$ of the second optical system.

The first optical system may be a CD optical system and the second optical system may be a DVD optical system.

According to another aspect of the present invention, there is provided an apparatus for identifying the type of an optical recording medium. The apparatus includes a signal detector which detects a surface reflected signal $S_S$ and a writable-surface reflected signal $S_R$ of an optical recording medium while performing a focus search using a first optical system when the optical recording medium is inserted, a calculator which counts a time difference $DT_S$ between a high peak and a low peak of the surface reflected signal $S_S$ and a time difference $DT_R$ between the high peak of the surface reflected signal and a high peak of the writable-surface reflected signal $S_R$, and obtains DT by substituting $DT_R$ and $DT_S$ into the following equation:

$$DT = \frac{(DT_R)^a}{(DT_S)^b}\left(a - b \geq \frac{1}{2}\right),$$

and an optical recording medium identification unit which identifies the type of the optical recording medium by comparing DT with a reference time T stored in advance and outputs a signal used to drive a first optical system or a second optical system.

In one embodiment, the $DT_R$ of the first optical system is greater than $DT_R$ of the second optical system.

The optical recording medium identification unit may drive the first optical system if DT is greater than T and may drive the second optical system if DT is not greater than T.

In another embodiment, the first optical system is a CD optical system and the second optical system is a DVD optical system.

As described above, the present invention provides a method and an apparatus for identifying the type of an optical recording medium, which are capable of figuring out the type of an optical recording medium by using a slope of an S curve of a surface reflected signal and a time difference between the S curve of the surface reflected signal and an S curve of a writable-surface reflected signal even when an actuator lacks linearity.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings. First of all, an apparatus for recording/reproducing data on/from an optical recording medium according to an embodiment of the present invention will be described in the following paragraphs.

Figure 1:
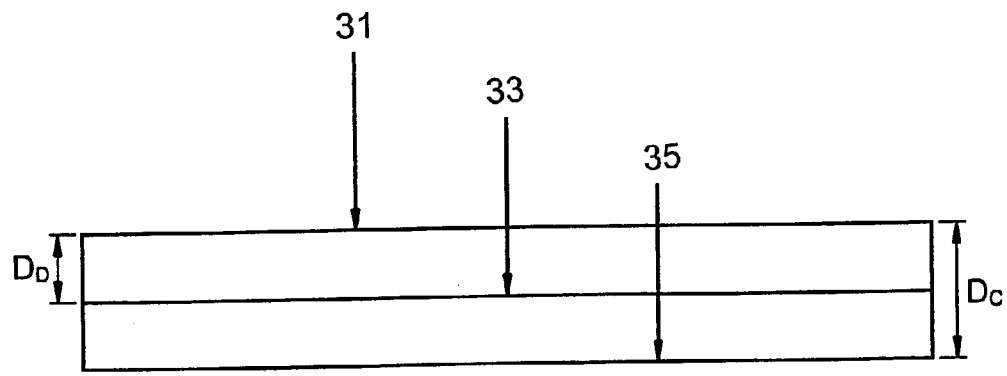
FIG. 1 is a cross-sectional view illustrating the thickness of a CD compared with the thickness of a DVD.
Figure 2:
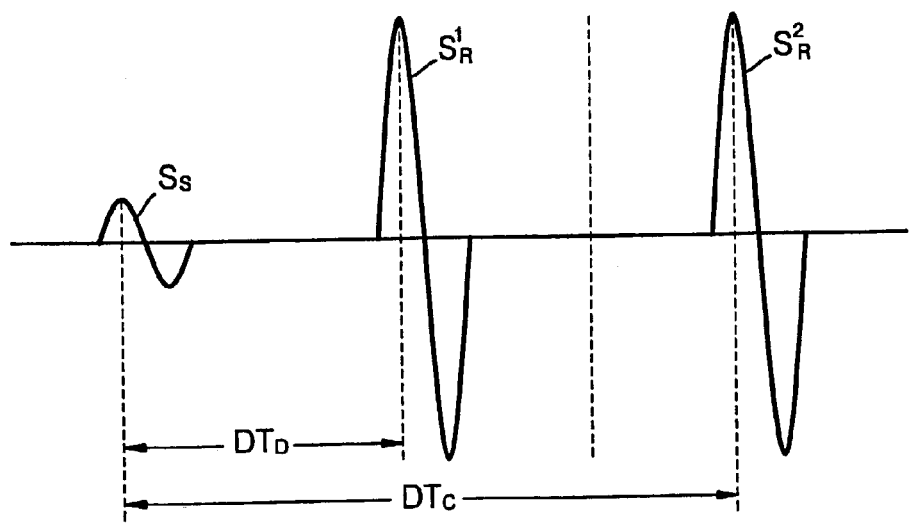
FIG. 2 is a graph illustrating a conventional method for identifying the type of an optical recording medium.
Figure 3:
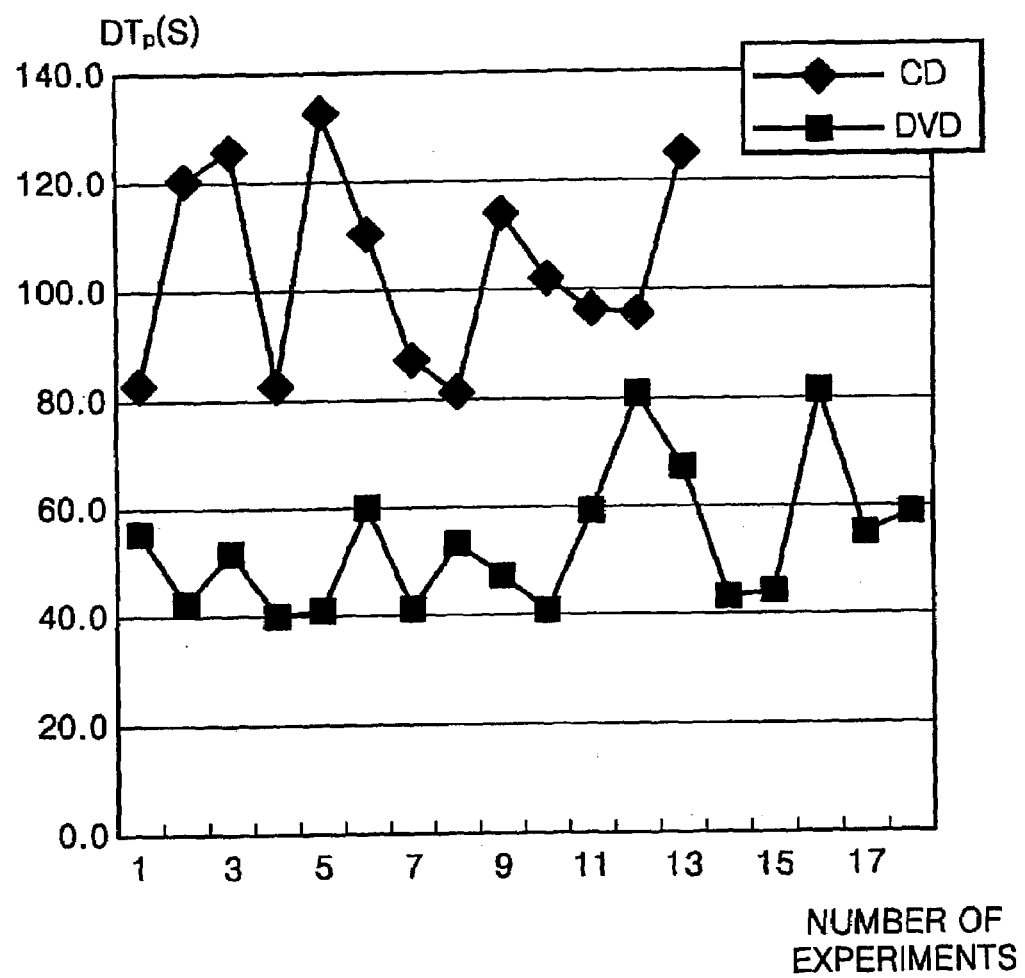
FIG. 3 is a graph showing the variation of a DT value with respect to a number of times an experiment for obtaining such DT value has been performed in the case of using the conventional method for identifying the type of an optical recording medium.
Figure 4:
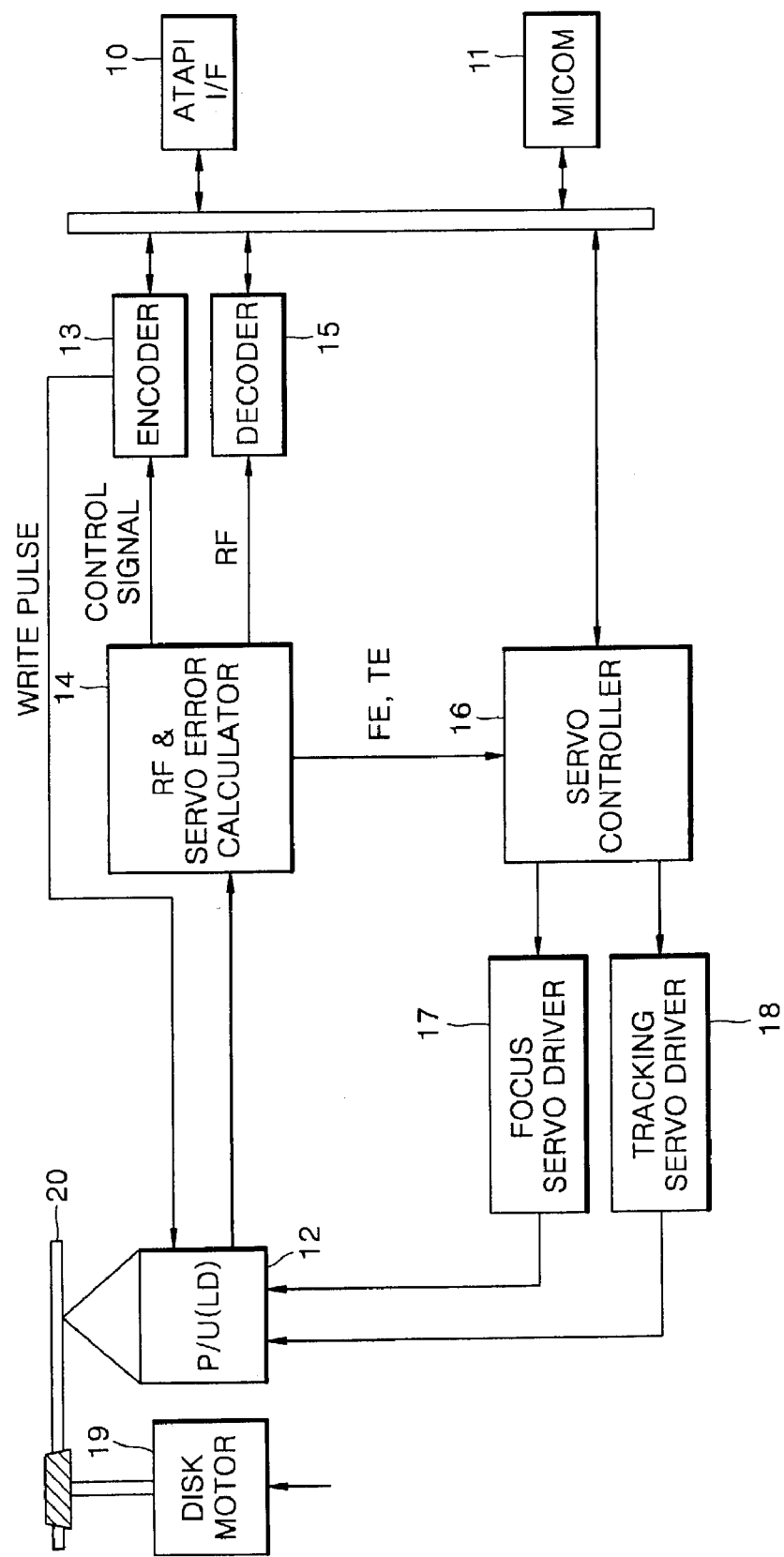
FIG. 4 is a block diagram of an apparatus for recording/reproducing data on/from an optical recording medium.

FIG. 4 is a block diagram of an apparatus for recording/reproducing data on/from an optical recording medium according to a preferred embodiment of the present invention. Referring to FIG. 4, in response to a control signal output from a servo controller 16, an optical pickup 12 focuses light beams, which have been condensed by an object lens, on a signal track, and then transmits the condensed light beams, which are reflected from a writable surface of an optical disk 20 using the object lens, to an optical detector (not shown) in order to detect a focus signal and a tracking error signal TE.

The optical detector comprises a plurality of optical detection devices and outputs an electric signal having an amplitude, which is proportional to the amount of light obtained from each of the optical detection devices, to a radio-frequency and servo error calculator 14. The radio-frequency and servo error calculator 14 calculates based on the electric signal output from the optical detector a radio-frequency signal RF used to reproduce data from the optical disk 20, and a focus error signal FE and the tracking error signal TE used to control a servo. Thereafter, the optical detector outputs the radio-frequency signal RF used to reproduce data from the optical disk 20 to a decoder 15, outputs servo error signals, such as FE and TE, to the servo controller 16, and outputs a control signal used to record data on the optical disk 20 to an encoder 13.

The encoder 13 encodes data to be recorded on the optical disk 20 into write pulses having a format appropriate for the optical disk 20 and then records the encoded data on the optical disk 20 using the optical pickup 12. The decoder 15 retrieves the original data from the optical disk 20 based upon the radio-frequency signal RF.

The apparatus for recording/reproducing data on/from an optical disk can be connected to a host, such as a personal computer (PC). Then the host transmits a command to record data on the optical disk 20 or to reproduce data from the optical disk 20 to a micom 11, transmits data to be recorded on the optical disk 20 to the encoder 13, and receives data to be reproduced from the optical disk 20 from the decoder 15 by using an interface 10 of the apparatus for recording/reproducing data on/from an optical disk. The micom 11 controls the encoder 13, the decoder 15, and the servo controller 16 in response to the data recording or reproducing command input from the host.

Here, an advanced technology attached packet interface (ATAPI) is used as the interface 10. The ATAPI is a standard interface connecting between an apparatus for recording/reproducing data on/from an optical disk and a host so as to transmit decoded data from the apparatus for recording/ reproducing data on/from an optical disk to the host. In other words, the ATAPI converts decoded data into packet-type protocol that can be processed by the host and transmits the packet-type protocol to the host.

The servo controller 16 processes the focus error signal FE and a driving signal used to control focusing to the focus servo driver 17. In addition, the servo controller 16 processes the tracking error signal TE and then outputs a driving signal used to control tracking to the tracking servo driver 18.

The tracking servo driver 18 adjusts the location of a light beam and follows tracks of the optical disk 20 by moving the object lens of the optical pickup 12 in a radial direction while driving a tracking actuator in the optical pickup 12.

The focus servo driver 17 follows tracks of the optical disk 20 by moving the optical pickup 12 in a direction perpendicular to the optical disk 20 while driving a focus actuator in the optical pickup 12. During this operation, it is important to maintain a predetermined distance between the object lens and the optical disk 20. Here, the focus servo driver 17 may be replaced by a focus servo controller of an apparatus for identifying the type of an optical recording medium according to an embodiment of the present invention.

When the optical disk 20 is inserted into the apparatus for recording/reproducing data on/from an optical disk, it is necessary to figure out whether the optical disk 20 is a CD or a DVD, and after doing so, a servo operation appropriate for the type of the optical disk 20 can be performed.

Figure 5:
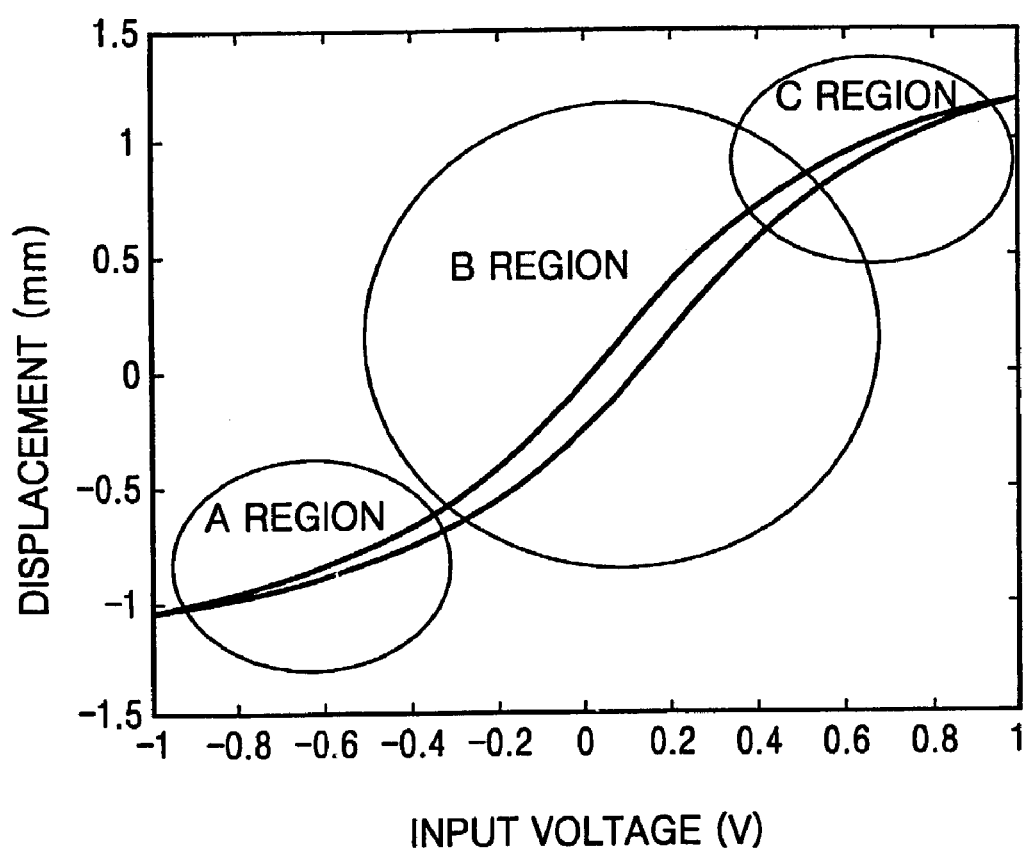
FIG. 5 is a graph showing a variation in the displacement of an actuator in a focus direction with respect to an input voltage in an apparatus for recording/reproducing data on/from an optical recording medium.

FIG. 5 is a graph of the displacement of an actuator versus an input voltage applied to the actuator when driving the actuator in a focus direction, i.e., in a direction perpendicular to the surface of an optical recording medium. Referring to FIG. 5, the displacement of an actuator vary in proportion to an input voltage in a B region, and thus the B region can be considered as a linear region where linearity is maintained. However, in A and C regions, the displacement of the actuator does not varies in proportion to an input voltage, and thus the A and C regions can be considered as non-linear regions. Accordingly, if the actuator is placed in a non-linear region, such as the A or C region, a focusing error may occur because the displacement of the actuator does not always vary in proportion to an input voltage.

Figure 6:
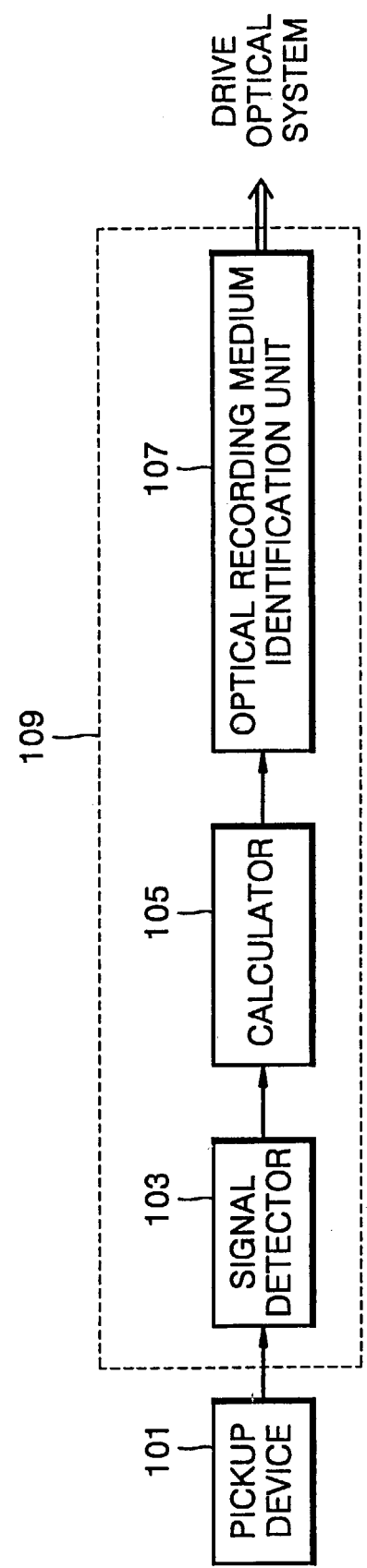
FIG. 6 is a block diagram of an apparatus for identifying the type of an optical recording medium according to an embodiment of the present invention.
Figure 7:
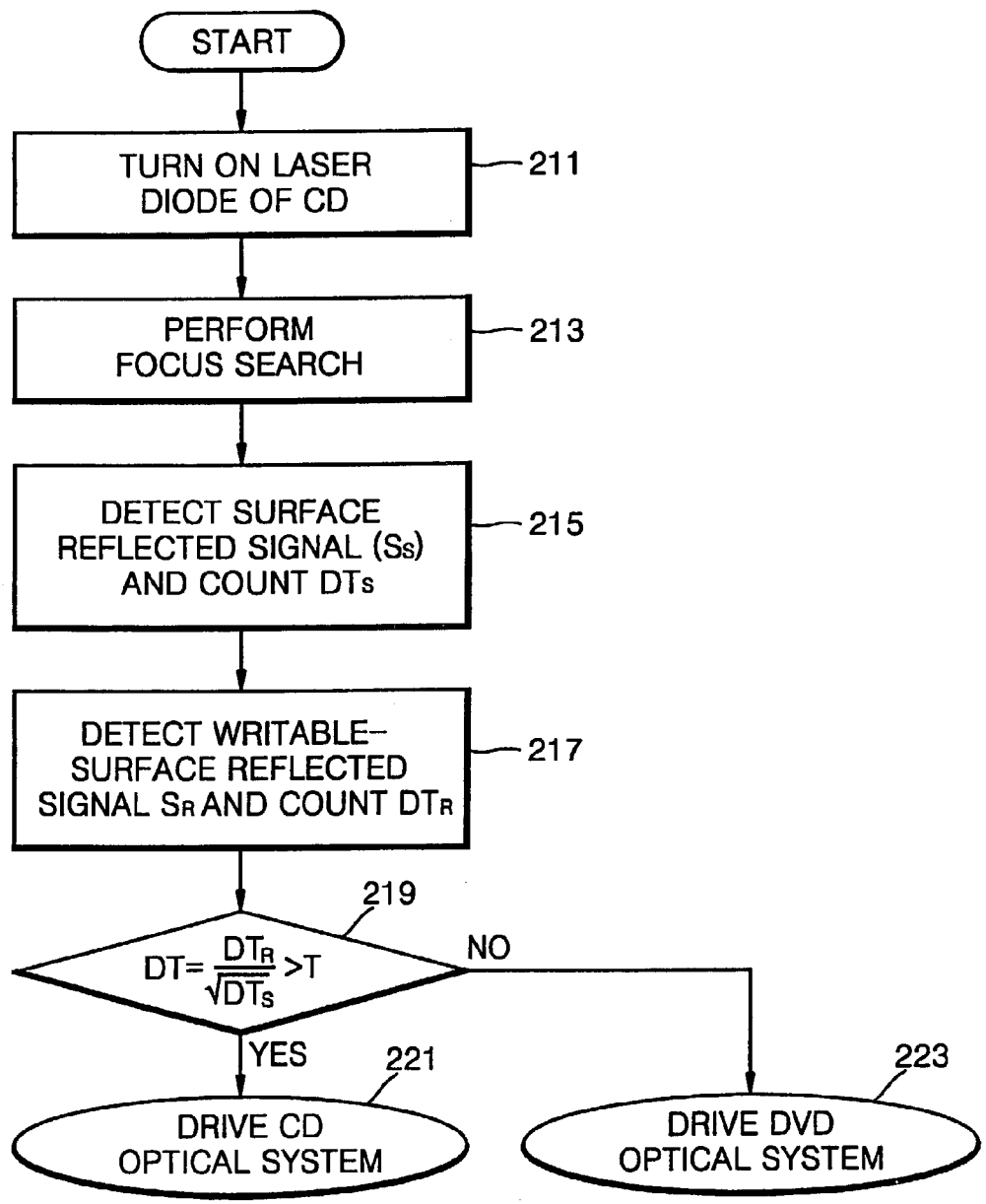
FIG. 7 is a block diagram of a flowchart of a method for identifying the type of an optical recording medium according to an embodiment of the present invention.

Therefore, there is a need to precisely figure out the type of an optical recording medium using an apparatus and a method for identifying the type of an optical recording medium according to the present invention shown in FIGS. 6 and 7, respectively. The apparatus and the method for identifying the type of an optical recording medium, shown in FIGS. 6 and 7, respectively, use an algorithm which is capable of making up for nonlinearity in the variation of the displacement of an actuator with respect to an input voltage.

Referring to FIG. 6, an apparatus for identifying the type of an optical recording medium according to an embodiment of the present invention includes a pickup device 101 having a laser diode and a focus servo controller 109 outputting a signal used to control a focus servo in response to a signal input from the pickup device 101.

The focus servo controller 109 includes a signal detector 103, which detects a surface-reflected signal SS and a writable-surface reflected signal SR among signals output from a first optical system including a first laser diode, a calculator 105, which calculates a time period DT between the time when the surface-reflected signal SS is detected and the time when the writable-surface reflected signal SR is detected by substituting into Equation (1) below a time period DTS between a high peak and a low peak of the surface reflected signal SS and a time period DTR between a high peak of the writable-surface reflected signal SR and the high peak of the surface reflected signal SS, and an optical recording medium identification unit 107, which identifies the type of an optical recording medium by comparing DT with a reference time T stored in advance.

After identifying the type of an optical recording medium, the optical recording medium identification unit 107 outputs a focus servo control signal appropriate for the type of the optical recording medium and drives a first or a second optical system using the focus servo control signal. Here, the first and second optical systems drive first and second optical recording media, respectively.

The first optical recording medium is thicker than the second optical recording medium. Accordingly, DTR of the first optical recording medium is larger than DTR of the second optical recording medium. If, in a predetermined optical recording medium, DT is greater than T, the optical recording medium identification unit 107 identifies the predetermined optical recording medium as the first optical recording medium and then outputs a signal used to drive the first optical system. On the other hand, if DT is not greater than T, the optical recording medium identification unit 107 identifies the predetermined optical recording medium as the second optical recording medium and outputs a signal used to drive the second optical system so that a second laser diode can be turned on.

Here, the first and second optical systems may represent a CD optical system and a DVD optical system, respectively, or a DVD optical system and a next-generation DVD optical system, respectively. Each of the first and second optical systems includes a laser diode having a wavelength band appropriate for driving a CD, a DVD, or a next-generation DVD.

Figure 8:
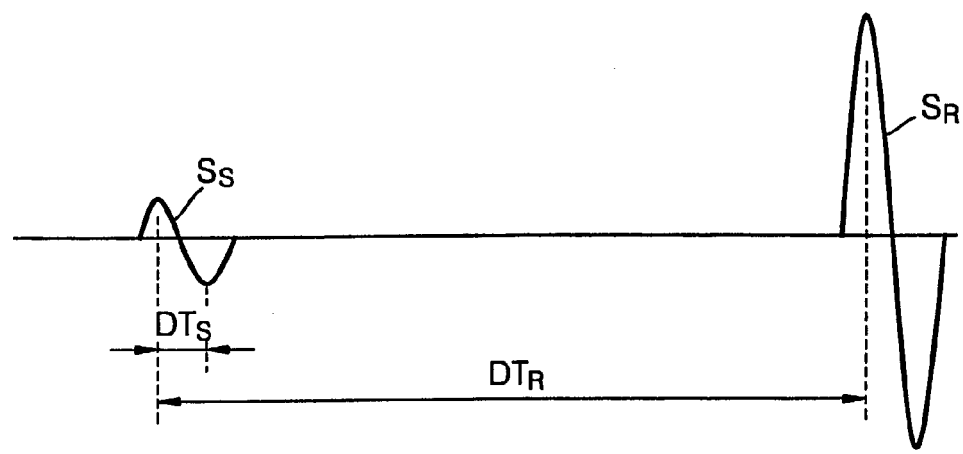
FIG. 8 is a graph illustrating a method for identifying the type of an optical recording medium according to an embodiment of the present invention.

FIG. 7 is a flowchart of a method for identifying the type of an optical recording medium according to an embodiment of the present invention, and FIG. 8 is a diagram illustrating S-curves of a surface-reflected signal SS and a writable-surface reflected signal SR. In FIG. 7, a first optical system and a second optical system represent a CD optical system and a DVD optical system, respectively. However, the first and second optical systems may represent a DVD optical system and a next-generation DVD optical system, respectively.

Referring to FIG. 7, when an optical recording medium is inserted into an apparatus for recording/reproducing data on/from an optical recording medium, a laser diode of the first optical system, i.e., a CD optical system, is turned on, and then a laser beam is irradiated on the optical recording medium in operation 211. Thereafter, focus search is performed in operation 213.

In operation 215, a surface reflected signal SS is detected from a light beam reflected from a surface of the optical recording medium, and then a time period DTS between a high peak and a low peak of the surface reflected signal SS is counted, as shown in FIG. 8.

In operation 217, a writable-surface reflected signal SR is detected from a light beam reflected from a writable surface of the optical recording medium at intervals of a predetermined amount of time, and then a time period DTR between a high peak of a writable-surface reflected signal SR and the high peak of the surface reflected signal SS is counted, as shown in FIG. 8. Here, a time period between the writable-surface reflected signal SR and the surface reflected signal SS in the same phase state is always the same as DTR. However, for the accuracy of calculation, a time difference between the high peaks of the writable-surface reflected signal SR and of the surface reflected signal SS is counted.

In operation 219, Equation (2) is obtained by setting variables a and b in Equation (1) to 1 and ½, respectively, DT is obtained by substituting DTR and DTS, which are obtained in operations 215 and 217, respectively, into Equation (2), and then DT is compared with a reference time T, which has been determined in advance. If DT is greater than T, $$DT = \frac{(DT_R)^a}{(DT_S)^b}\left(a - b \geq \frac{1}{2}\right) \quad (1)$$

$$DT = \frac{DT_R}{\sqrt{DT_S}} \quad (2)$$

It is possible to compensate for the lack of linearity of an actuator by varying the values of the variables a and b in Equation (1). Equation (3) below is obtained by setting the variables a and b to 2 and 1, respectively.

$$DT = \frac{DT_R^2}{DT_S} \quad (3)$$

When an actuator inclines toward a focus direction, the time period $DT_S$ between the high and low peaks of the surface reflected signal $S_S$ decreases in inverse proportion to the slope of the actuator. Accordingly, in the present invention, a method of compensating for nonlinearity of the actuator by introducing $DT_S$ as a denominator in an equation for DT is provided.

Figure 9:
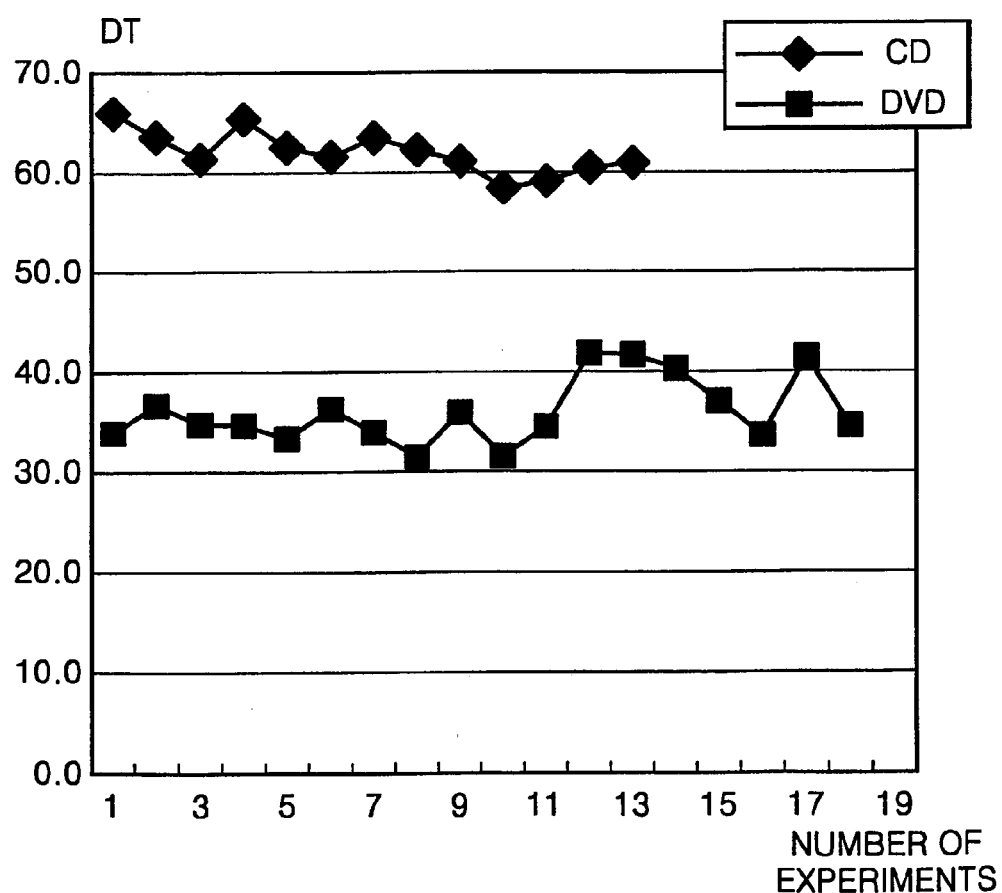
FIG. 9 is a graph showing the variation of a DT value with respect to a number of times an experiment for obtaining such DT value has been performed in the case of using the method for identifying the type of an optical recording medium according to the present invention.

FIG. 9 is a graph showing the variation of a DT value with respect to a number of times an experiment for obtaining such DT value has been performed in the case of using the method for identifying the type of an optical recording medium according to the present invention. DT values in FIG. 9 are obtained by using Equation (2).

Referring to FIG. 9, in the case of using the apparatus and method for identifying the type of an optical recording medium, DT values are evenly distributed on the graph of FIG. 9. Most DT values for a CD range from 60 and 70, and DT values for a DVD generally range from 30 and 40. Accordingly, it is possible to clearly figure out the type of an optical recording medium by setting a reference time T to about 50.

The method and the apparatus for identifying the type of an optical recording medium according to the present invention can more precisely figure out the type of an optical recording medium by compensating for lack of linearity of an actuator taking advantage of a high peak and a low peak of a surface reflected signal, and accordingly, can generally improve the performance of an apparatus for recording/reproducing data on/from an optical recording medium.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method identifying the type of an optical recording medium, comprising:

detecting a surface reflected signal $S_S$ and a writable-surface reflected signal $S_R$ of an optical recording medium while performing a focus search using a first optical system;

counting a time difference $DT_S$ between a high peak and a low peak of the surface reflected signal $S_S$;

counting a time difference $DT_R$ between the high peak of the surface reflected signal and a high peak of the writable-surface reflected signal $S_R$;

obtaining DT by substituting $DT_R$ and $DT_S$ into the following equation:

$$DT = ((DT_R)^a / (DT_S)^b)$$

where (a−b ≥ ½) and comparing DT with a reference time T; and driving the first optical system if DT is greater than T and driving a second optical system if DT is not greater than T.

2. The method of claim 1, wherein $DT_R$ of the first optical system is greater than $DT_R$ of the second optical system.

3. The method of claim 2, wherein the first optical system is a CD optical system.

4. The method of claim 3, wherein the second optical system is a DVD optical system.

5. The method of claim 1, further comprising:

activating a laser diode of the first optical system; and performing the focus search with the laser diode of the first optical system.

6. An apparatus identifying the type of an optical recording medium, comprising:

a signal detector which detects a surface reflected signal $S_S$ and a writable-surface reflected signal $S_R$ of an optical recording medium while performing a focus search using a first optical system when the optical recording medium is inserted;

a calculator which counts a time difference $DT_S$ between a high peak and a low peak of the surface reflected signal $S_S$ and a time difference $DT_R$ between the high peak of the surface reflected signal and a high peak of the writable-surface reflected signal $S_R$, and obtains DT by substituting $DT_R$ and $DT_S$ into the following equation:

$$DT = ((DT_R)^a / (DT_S)^b)$$

where (a−b ≥ ½); and an optical recording medium identification unit which identifies the type of the optical recording medium by comparing DT with a reference time T stored in advance and outputs a signal used to drive a first optical system or a second optical system.

7. The apparatus of claim 6, wherein $DT_R$ of the first optical system is greater than $DT_R$ of the second optical system.

8. The apparatus of claim 7, wherein the optical recording medium identification unit drives the first optical system if DT is greater than T and drives the second optical system if DT is not greater than T.

9. The apparatus of claim 8, wherein the first optical system is a CD optical system.

10. The apparatus of claim 9, wherein the second optical system is a DVD optical system.

11. A method of selecting an optical media system compatible with an optical recording medium type, the method comprising:

counting a time difference $DT_S$ between a high peak and a low peak of a surface reflected signal $S_S$ and a time difference $DT_R$ between the high peak of the surface reflected signal and a high peak of a writable-surface reflected signal $S_R$;

driving a first optical system if DT is greater than a reference time T and driving a second optical system if DT is not greater than T, wherein DT is calculated as $$DT=((DT_R)^a/(DT_S)^b) \text{ where } (a-b \geq \tfrac{1}{2}).$$

12. An optical system that records/reproduces data on/from an optical recording medium having a first optical format type or a second optical format type, comprising:

an optical pickup that transmits light beams onto an optical recording medium;

a focus servo controller that identifies the optical recording format type as either the first optical format type or the second optical format type by comparing DT with a reference time T, wherein DT is calculated by counting a time difference $DT_S$ between a high peak and a low peak of a surface reflected signal $S_S$ of the light beam and a time difference $DT_R$ between the high peak of the surface reflected signal and a high peak of a writable-surface reflected signal $S_R$, of the light beam and substituting $DT_R$ and $DT_S$ into the equation:

$$DT=((DT_R)^a/(DT_S)^b) \text{ where } (a-b \geq \tfrac{1}{2}).$$

13. The optical system of claim 12, wherein the focus servo controller comprises:

a signal detector that detects the surface reflected signal $S_s$ and the writable-surface reflected signal $S_R$.

14. The optical system of claim 12, wherein the focus servo controller comprises:

a calculator that counts the time difference $DT_S$ and the time difference $DT_R$.

15. The optical system of claim 12, wherein the focus servo controller comprises:

an optical recording identification unit that identifies the optical recording medium as having the first optical format type if DT is less than the reference time T or as having the second optical format type if DT is greater than the reference time T.

16. The optical system of claim 15, wherein the optical recording identification unit outputs a first signal used to drive a first optical system compatible with the first optical format type or a second signal used to drive a second optical system compatible with the second optical format type.

17. The system of claim 12, further comprising:

an encoder that encodes data to be recorded on the optical recording medium into write pulses having the first optical format type or the second optical format type.

18. The system of claim 12, further comprising:

a decoder that retrieves original data from the optical recording medium.

19. The system of claim 12, further comprising:

a microcomputer that receives recording commands from a host for forwarding to the focus servo controller.

20. The system of claim 19, further comprising:

an interface that converts decoded data from the optical system into packet-type protocol data to be processed by the host.

21. The system of claim 12, further comprising:

a focus servo driver that follows tracks of the optical recording medium by moving the optical pickup in a direction perpendicular to the optical recording medium while driving a focus actuator in the optical pickup.

22. The system of claim 12, further comprising:

a tracking servo driver that adjusts the location of the light beam and follows tracks of the optical recording medium by moving an object lens of the optical pickup in a radial direction while driving a tracking actuator in the optical pickup.

23. The system of claim 12, further comprising:

a disk motor rotating the optical recording medium at a predetermined speed according to the first optical format type or the second optical format type.

* * * * *